(12) United States Patent
Jurado et al.

(10) Patent No.: US 7,708,893 B2
(45) Date of Patent: May 4, 2010

(54) SYSTEM AND METHOD FOR PROVIDING FILTRATION IN A SUN PINION BORE

(75) Inventors: Augusto Xavier Jurado, Erie, PA (US); Richard E. Rzepka, Erie, PA (US)

(73) Assignee: General Electric Company, Schenectady, NY (US)

( * ) Notice: Subject to any disclaimer, the term of this patent is extended or adjusted under 35 U.S.C. 154(b) by 824 days.

(21) Appl. No.: 11/536,738

(22) Filed: Sep. 29, 2006

(65) Prior Publication Data

US 2007/0017873 A1 Jan. 25, 2007

Related U.S. Application Data

(63) Continuation-in-part of application No. 11/056,989, filed on Feb. 11, 2005, now Pat. No. 7,585,244.

(51) Int. Cl.
*F16H 57/04* (2006.01)
*B01D 35/06* (2006.01)

(52) U.S. Cl. ............... 210/695; 210/222; 475/159; 184/6.25

(58) Field of Classification Search .............. 210/222, 210/695; 475/159; 184/6.25
See application file for complete search history.

(56) References Cited

U.S. PATENT DOCUMENTS

2005/0059523 A1  3/2005  Hasegawa et al.
2005/0250611 A1  11/2005  Jurado et al.

FOREIGN PATENT DOCUMENTS

WO    WO2005/108826       11/2005
WO    WO 2008039586 A1 *  4/2008

* cited by examiner

*Primary Examiner*—David A Reifsnyder
(74) *Attorney, Agent, or Firm*—Robert Wawrzyn, Esq.; Terry M. Sanks, Esq.; Beusse Wolter Sanks Mora & Maire, P.A.

(57) ABSTRACT

A filtration system for a motorized wheel off-highway vehicle transmission that is proximate a sun pinion bore within the transmission, the system includes a helix shaped element that traverses along a longitudinal axis of the sun pinion bore, a magnet proximate the helix shaped element, and a housing proximate the helix shaped element and magnet.

11 Claims, 4 Drawing Sheets

SYSTEM AND METHOD FOR PROVIDING FILTRATION IN A SUN PINION BORE

RELATED APPLICATIONS

This application is a continuation-in-part of U.S. patent application Ser. No. 11/056,989, filed Feb. 11, 2005, now U.S. Pat. No. 7,585,244 B2 the contents of which are incorporated herein by reference in its entirety.

FIELD OF THE INVENTION

Embodiments of the invention relate generally to the lubrication of a transmission and, more particularly, to filtration in a sun pinion bore for an electric mining truck transmission.

BACKGROUND OF THE INVENTION

Large off-road, heavy-duty work vehicles, such as mining vehicles used to haul heavy payloads excavated from open pit mines, are well known and usually employ motorized wheels for propelling or retarding the vehicle in an energy efficient manner. This efficiency is typically accomplished by employing a large horsepower diesel engine in conjunction with an alternator and a main traction inverter. The diesel engine is directly associated with the alternator such that the diesel engine drives the alternator. The alternator is used to power the main traction inverter, wherein the main traction inverter supplies power having a controlled voltage and frequency to two drive or traction motors connected to the rear wheels of the vehicle. The motors may be either AC or DC operated. As each drive motor is operated, the drive motor causes a transmission drive shaft to rotate at a low torque and high speed about the drive shaft axis. Because the transmission drive shaft is directly associated with the vehicle transmission, the low torque high speed rotational energy of the transmission drive shaft is communicated to the vehicle transmission. The vehicle transmission then takes the low torque high speed rotational energy supplied by the transmission drive shaft and converts this energy into a high torque low speed rotational energy output which is supplied to the rear wheels.

The conversion of this low torque high speed rotational energy into a high torque low speed rotational energy is typically accomplished using a double reduction gear set disposed within the vehicle transmission. A double reduction gear set is a series of gears, pinions and planets that includes a first reduction stage and a second reduction stage. The first reduction stage may include a high-speed sun pinion, a plurality of high-speed planets and a stationary ring gear and the second reduction stage may include a low-speed sun pinion, a plurality of low-speed planets and a stationary ring gear. The output of the first reduction stage is connected to the input of the second reduction stage and may be referred to as the high-speed carrier. In a similar manner, the output of the second reduction stage is connected to the vehicle wheels via a torque tube/hub assembly. Inward and outward thrust washers on the low-speed pinion enable rotation of the low-speed pinion relative to the high-speed pinion and the transmission housing.

As described above, a transmission of this type includes a plurality of moving parts that interact and mesh with each other in order to convert the low torque high-speed energy into high torque low-speed energy. As such, it is essential to keep all of the parts of the transmission well lubricated to avoid undue wear and equipment failure. Currently, the components within the transmission are lubricated using a "splash" process. This "splash" process involves partially filling the torque tube/hub assembly with oil such that the lubrication is distributed to the transmission components during movement of the high-speed carrier, the low-speed carrier, the high-speed planets and the low-speed planets. As these components move, the lubricating oil contained within the torque tube that has adhered to these components splashes from the carriers onto the components contained in the transmission, such as the low-speed sun pinion. As the low-speed sun pinion and the high-speed planets mesh together, the oil that adheres to both gears during the "splash" process gets squeezed out of the mesh in the axial direction of the transmission, providing lubrication to additional parts of the transmission. This provides lubrication to the radial outer surfaces of the thrust washers, but not to the radial inner surfaces.

Although the above lubrication process provides for sufficient lubrication of all of the internal parts of the transmission, including key wear components, any additional oil flow to critical areas of the transmission would be advantageous and may provide an additional margin of safety for those wheels that may be subjected to additional loads due to application and/or working environment. This additional margin of safety is desirable as an additional precaution to prevent the need for frequent replacement of equipment parts and/or catastrophic failure of the equipment.

A filter placed within the bore of a sun pinion could improve wheel lube quality, which in turn may improve wheel gearing/bearing life. However no substantial oil pressure is presently available, in part because filters work with pressure differential. If the filter creates too much of a pressure drop, the oil simply would not flow through the bore. Flow of oil cannot be restricted from reaching the internal parts of the transmission because such a condition would cause excessive wear and failure of internal components. There does not appear to be any existing filter that works without actual fluid pressure and no existing filter that does not restrict flow in relation to filter contamination.

SUMMARY OF THE INVENTION

Embodiments of the invention are directed towards improved lubrication and filtration of an electric mining truck transmission. Towards this end, in an exemplary embodiment a sun pinion cover for a motorized wheel off-highway vehicle transmission is provided, wherein the vehicle transmission includes a high-speed pinion and high-speed planets positioned around the pinion at an inward side of the transmission. The vehicle transmission further includes a low-speed pinion and low-speed planets positioned around the low-speed pinion at an outward side of the transmission and a transmission housing which defines a transmission cavity for receiving the pinions and planets and a transmission opening disposed at a longitudinal axis of the transmission at an outward end of the transmission housing for enabling access to the pinions and planets. The low-speed pinion is of generally tubular construction and defines a central passage therein, wherein the low-speed pinion includes an inward thrust washer at one end toward the high-speed pinion and an outward thrust washer toward the transmission opening. The sun pinion cover includes a cover body structure detachably secured to the transmission housing for covering the transmission opening at the longitudinal axis of the transmission. The cover body structure defines a lubricant duct which extends in a generally radial direction with respect to the longitudinal axis of the transmission and presents a first lubricant inlet port at an inner surface of the cover and a second lubricant outlet duct at the inner surface of the cover, with the duct enabling lubricant flow from the first inlet port to the second outlet port, the first lubricant inlet port being positioned adjacent the low-speed planets in the transmission cavity to receive lubricant expelled by the planets and the second lubricant outlet port being disposed adjacent the low-speed pinion central passage for flow of lubricant from the transmission cavity to the central passage of the pinion for distributing lubricant to the inward and outward thrust washers on the low-speed pinion.

In another exemplary embodiment a transmission assembly for an electric motor driven, off-highway vehicle is provided and includes a transmission housing, wherein the transmission housing defines a transmission cavity and a transmission opening, wherein the transmission opening is communicated with the transmission cavity. A reduction gear set is also provided, wherein the reduction gear set includes a low-speed pinion which defines a pinion cavity, the low-speed pinion being disposed within the transmission cavity to be adjacent the transmission opening. Additionally, a sun pinion cover is provided, wherein the sun pinion cover includes a cover body structure which defines a first lubricant opening, a second lubricant opening and a lubricant conduction channel, wherein the lubricant conduction channel communicates the first lubricant opening with the second lubricant opening and wherein the sun pinion cover is associated with the transmission housing such that the sun pinion cover is disposed over the transmission opening and such that the first lubricant opening is communicated with the transmission cavity and such that the second lubricant opening is communicated with the pinion cavity.

In yet another exemplary embodiment, a sun pinion cover for an electric-motor driven, off-highway vehicle transmission is provided and includes a low-speed pinion and a transmission housing structure defining a transmission opening that is communicated with a transmission cavity, wherein the low-speed pinion is disposed within the transmission cavity and defines a pinion cavity. The sun pinion cover includes a cover body structure, where the cover body structure includes a cover inner surface and defines at least one lubricant conduction channel. The cover inner surface defines a plurality of channel openings communicated with each other via the at least one lubricant conduction channel and wherein when the sun pinion cover is associated with the transmission housing, the plurality of channel openings are disposed to communicate the transmission cavity with the pinion cavity to allow for a lubricant flow between the transmission cavity and the pinion cavity.

In another exemplary embodiment a method for increasing lubricant flow within an electric-motor driven, off-highway vehicle transmission is provided, wherein the transmission includes a low-speed pinion and a transmission housing structure which defines a transmission opening communicated with a transmission cavity, wherein the low-speed pinion defines a pinion cavity and is disposed within the transmission cavity. The method includes creating a lubricant conduction path between the transmission cavity and the pinion cavity and operating the electric-motor driven, off-highway vehicle transmission to cause a lubricant to flow between the transmission cavity and the pinion cavity via the lubricant conduction path.

In another exemplary embodiment, a filtration system for a motorized wheel off-highway vehicle transmission that is proximate a sun pinion bore within the transmission is also provided. The system includes a helix shaped element that traverses along a longitudinal axis of the sun pinion bore. A magnet proximate the helix shaped element, and a housing proximate the helix shaped element and magnet are also provided.

Yet in another exemplary embodiment a method for providing filtration of oil within a motorized wheel off-highway vehicle transmission where the transmission has a pinion cavity is disclosed. The method includes creating a lubricant conduction path between a transmission cavity and the pinion cavity. Lubricant flows therethrough the conduction path into the pinion cavity. A flow path of the lubricant is varied in the pinion cavity with a helix shaped filter located within the pinion cavity. The transmission is operated to cause the lubricant to flow between the transmission cavity and the pinion cavity so that filtration occurs as the lubricant flows therethrough the helix shaped filter.

BRIEF DESCRIPTION OF THE DRAWING FIGURES

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

Figure 1:
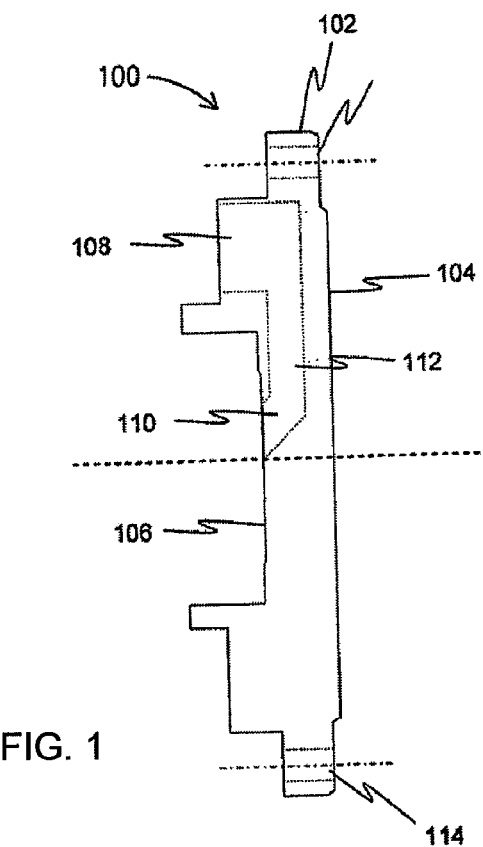
FIG. 1 is a cross sectional side view of an exemplary embodiment of a sun pinion cover, in accordance with an embodiment.

Referring to FIG. 1, a sun pinion cover 100 is illustrated and includes a cover body structure 102 having a cover outer surface 104 and a cover inner surface 106. Cover inner surface 106 defines a lubricant inlet port 108 and a lubricant outlet port 110, wherein lubricant inlet port 108 is communicated with lubricant outlet port 110 via a lubricant conduction channel 112. Sun pinion cover 100 also defines at least one suitable fastener engagement hole, such as a bolt hole, 114 disposed to allow sun pinion cover 100 to be detachably secured to a transmission assembly hub.

Figure 2:
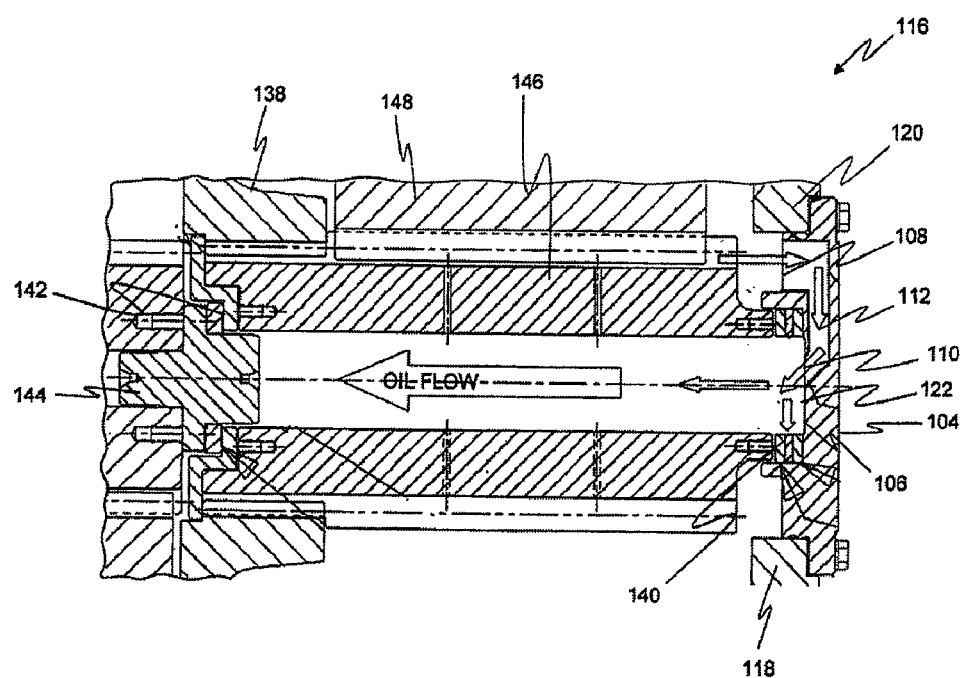
FIG. 2 is a side cutout view of an exemplary embodiment of a transmission employing the sun pinion cover of FIG. 3.
Figure 3:
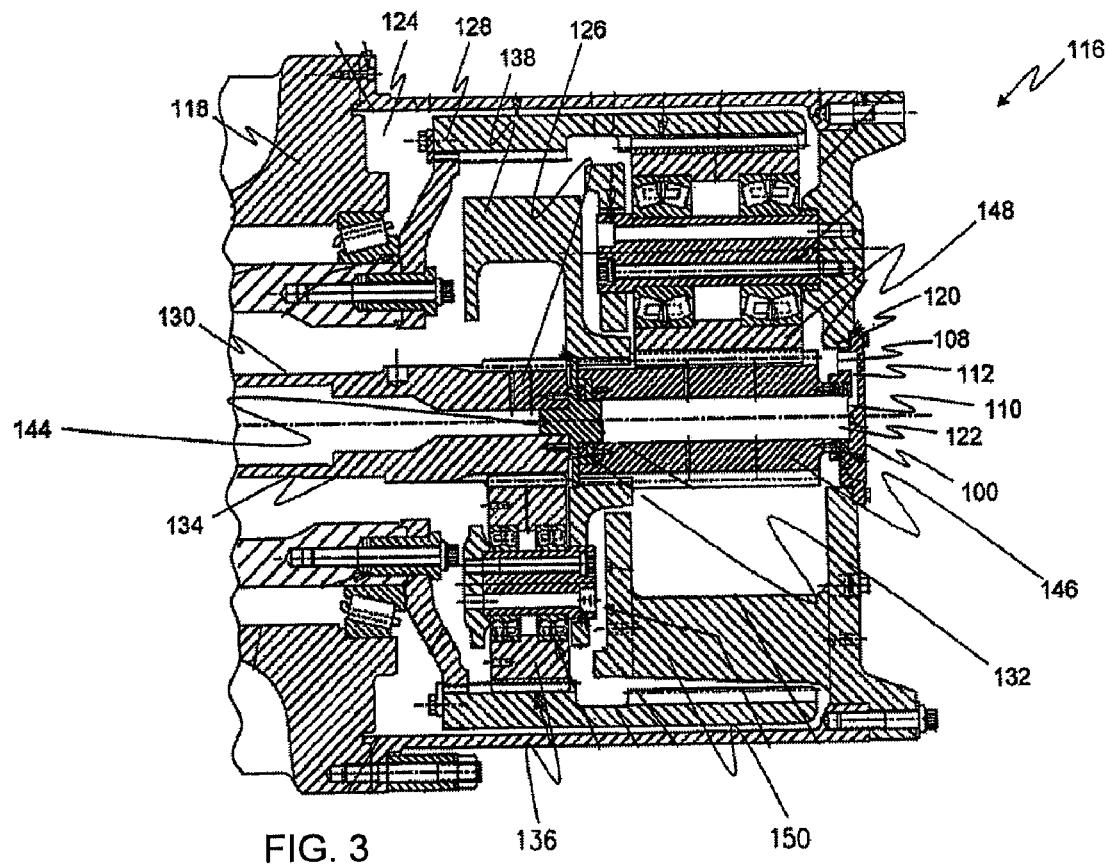
FIG. 3 is a side cutout view of an exemplary embodiment of a transmission employing the sun pinion cover of FIG. 3.

Referring to FIG. 2 and FIG. 3, a sun pinion cover 100 is shown detachably secured with a transmission 116. Transmission 116 includes a hub assembly 118, which defines at least one hub mounting cavity 120, a transmission opening 122 and a hub assembly cavity 124, wherein transmission opening 122 is communicated with hub assembly cavity 124. Transmission 116 also includes a double reduction gear set 126 disposed within hub assembly cavity 124, wherein double reduction gear set 126 includes a stationary ring gear 128, a first reduction stage 130 and a second reduction stage 132. First reduction stage 130 includes a high-speed sun pinion 134, a plurality of high-speed planets 136 and a high-speed carrier 138, wherein high-speed carrier 138 transmits the output of first reduction stage 130 to second reduction stage 132. High-speed carrier 138 is disposed within transmission 116 such that its axial motion is restrained by an outboard thrust washer 140 riding on the cover inner surface 106 and an inboard thrust washer 142 riding on a plug 144.

Second reduction stage 132 includes a low-speed sun pinion 146, a plurality of low-speed planets 148 and a low-speed carrier 150, wherein low-speed sun pinion 146 is the input to second reduction stage 132 and receives the output of first reduction stage 130 from high-speed carrier 138. Low-speed carrier 150 receives the output of second reduction stage 132 and transmits this high torque output to the vehicle wheels. Sun pinion cover 100 is shown non-movably associated with hub assembly 118 via at least one mounting device 152 such that sun pinion cover 100 is disposed over transmission opening 122 to sealingly enclose hub assembly cavity 124. Moreover, sun pinion cover 100 is disposed relative to hub assembly 118 such that lubricant inlet port 108 is adjacent the plurality of low-speed planets 148 and such that lubricant outlet port 110 is adjacent low-speed sun pinion 146. This allows lubricant to flow between plurality of low-speed planets 148 and low-speed sun pinion 146 via lubricant conduction channel 112. The cover 100 may include two or more channels 112 at spaced intervals around the cover 100. While channel 112 is shown as being spaced from the inner surface 106 of the cover 100 to present a passage open only at ends of inlet 108 and outlet 110, the channel may alternatively be formed as a recess in the inner surface 106 of the cover 100 extending between the inlet 108 and the outlet 110.

Figure 4:
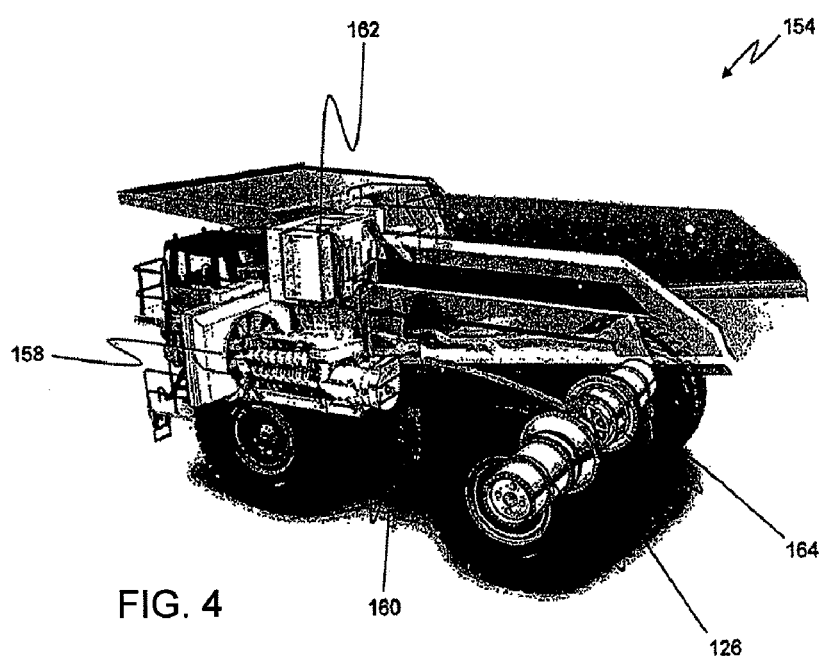
FIG. 4 is an additional side perspective view of an off-road, heavy-duty work vehicle of the type that uses a transmission, incorporating an embodiment of the invention.

Referring to FIG. 2, FIG. 35 and FIG. 4, an off-road, heavy-duty work vehicle 154 is shown and includes a large horsepower diesel engine 158 coupled to an alternator 160, a main traction inverter 162, at least one AC drive motor 164 and a transmission drive shaft 166. As the vehicle 154 is operated, diesel engine 158 drives alternator 160 to power main traction inverter 162. Main traction inverter 162 supplies power to AC drive motor 164, wherein main traction inverter 162 controls the voltage and frequency of the power supplied to AC drive motor 164. AC drive motor 164 converts this electrical energy into mechanical energy by causing transmission drive shaft 166 to rotate in relation to the power supplied to AC drive motor 164. The rotation of transmission drive shaft 166, which communicates AC drive motor 164 with high-speed sun pinion 134, transfers the mechanical energy from AC drive motor 164 to AC transmission 116.

As briefly discussed above, high-speed sun pinion 134 is part of first reduction stage 130. As such, because the rotation of transmission drive shaft 166 causes high-speed sun pinion 134 to rotate, the high-speed low torque mechanical energy from AC drive motor 164 is transferred into first reduction stage 130 via high-speed sun pinion 134. This high-speed low torque rotational energy is converted into lower-speed higher torque energy via first reduction stage 130 and transferred to second reduction stage 132 via low-speed sun pinion 146. The converted energy from first reduction stage 130 is converted further into low-speed high torque energy via second reduction stage 132. At this point, the low-speed high torque energy is transferred to the vehicle wheels via low-speed carrier 150. As the high-speed low torque energy received by AC transmission 116 is being converted into low-speed high torque energy, the components within AC transmission 116 are rapidly moving and interacting with each other.

When low-speed sun pinion 146 and low-speed planets 148 interact and mesh together, the lubricant that adheres to low-speed sun pinion 146 and low-speed planets 148 is compressed out of the mesh in the axial direction toward sun pinion cover 100. Because lubricant inlet port 108 is adjacent low-speed planets 148, the meshing of the low-speed planets and the sun-pinion provides a pumping action for directing lubricant into lubricant inlet port 108, through lubricant duct 112, out of lubricant outlet port 110 and into the central passage of low-speed sun pinion 146. This provides a continuous lubricant flow through the central passage of low-speed sun pinion 146 thus providing lubrication to outboard thrust washer 140 and inboard thrust washer 142. Lubricant flow to the inward and outward thrust washers thereby assures lubrication at the radial inner surfaces of these critical wear components for extending their useful lives.

Figure 5:
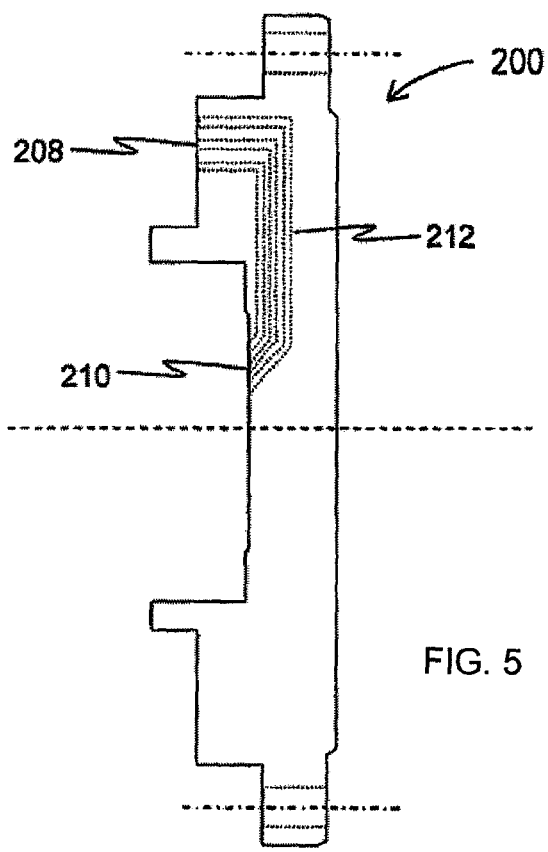
FIG. 5 is a cross sectional side view of an exemplary embodiment of a sun pinion cover, in accordance with a second embodiment.
Figure 6:
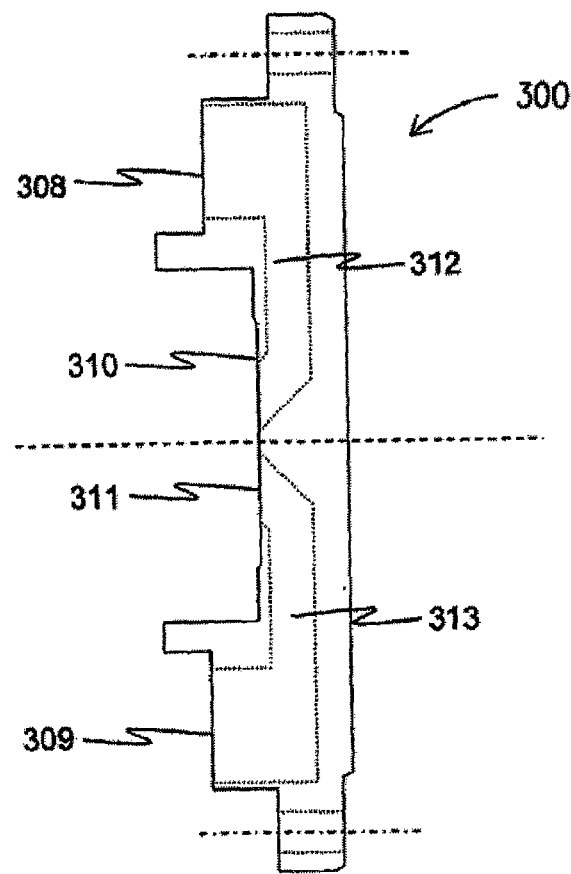
FIG. 6 is a cross sectional side view of an exemplary embodiment of a sun pinion cover, in accordance with a third embodiment.

Referring to FIG. 5, a second embodiment of sun pinion cover 200 is shown and includes a plurality of lubricant inlet ports 208, a plurality of lubricant outlet ports 210 and a plurality of lubricant ducts 212, wherein each of the plurality of lubricant inlet ports 108 are communicated with at least one of the plurality of lubricant outlet ports 210 via the plurality of lubricant ducts 212. Moreover, referring to FIG. 6, a third embodiment of sun pinion cover 300 is shown and includes a first lubricant inlet port 308, a second lubricant inlet port 309, a first lubricant outlet port 310 and a second lubricant outlet port 311, wherein the first lubricant inlet port 308 is communicated with the first lubricant outlet port 310 via a first lubricant duct 112 and wherein the second lubricant inlet port 309 is communicated with the second lubricant outlet port 311 via a second lubricant duct 313. It should be appreciated that a directional flow valve may be included and disposed to be communicated with the lubrication duct to control the direction of lubricant flow through the lubrication duct. Moreover, it should also be appreciated that although the sun pinion cover 100 is described herein as being associated with an AC transmission 116 having double reduction gear set 126, it should be appreciated that sun pinion cover 100 may be used with any type of transmission suitable to the desired end purpose.

Figure 7:
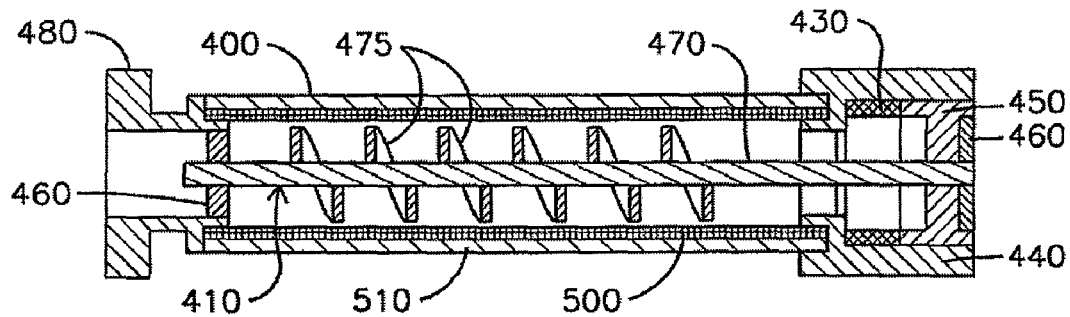
FIG. 7 is an exemplary embodiment of a filtration system depicting the present invention.

FIG. 7 is an exemplary embodiment of a filtration system, or apparatus. In an exemplary embodiment, the filtration apparatus, element, or device, 400 is disclosed within the transmission opening, or sun pinion bore 122. As already disclosed herein, the lubrication cover, or cap, 100 feeds oil into the sun pinion bore 122 to lubricate the internal thrust washer of the transmission. As further illustrated, a corkscrew, helix, or spiraling design is disclosed within the filtration apparatus 400. Thus the filter 400 is used in conjunction with the lubrication cap 100 to achieve filtration. This is accomplished without fluid pressure and without restricting flow to post filter parts.

More specifically, the filter 400 has a helix, spiral, twisted, or corkscrew shaped element 410. Though illustrated as being uniform in its appearance, those skilled in the art will readily recognize that the shape of the helix shaped element 410 need not be uniform. Towards this end, the twists may be of various shapes, contours, and/or bends. A magnet 430 is disclosed proximate the helix shaped element 410. The magnetic field produced by the magnet 430 increases filtering effectiveness. Securing devices are used to hold the helix shaped element 410 and magnet in position. More specifically, a magnet housing 440 is disclosed which holds the magnet 430. A housing cap 450 is provided to close an end of the magnet housing 440. A snap ring 460 is also provided. As illustrated a center sub-part 470 of the helix shaped element 410 extends beyond the helix-shaped sub-part 475 into the magnet housing 440. The snap ring 460 is provided to hold the end of the center sub-part 470.

At a second end of the helix shaped element 410, a snap ring 460 is provided to hold the end of the center sub-part 470.

An end cap housing 480 is further provided at the second end. Surrounding the helix-shaped sub-part 475 is a filtration material 500, such as but not limited to a mesh pack. The filtration material 500 is positioned to make contact with the fluid that flows therethrough the helix element 410. A support tube 510 surrounds the filtration material 500. The support tube 510 and/or mesh pack 500 is attached to the magnet housing 440 at one end, and to the end cap 480 at a second end. Those skilled in the art will readily recognize that the support tube 510 and/or filtration material 500 may be connected to other elements, such as but not limited to the housing cap 450.

Figure 8:
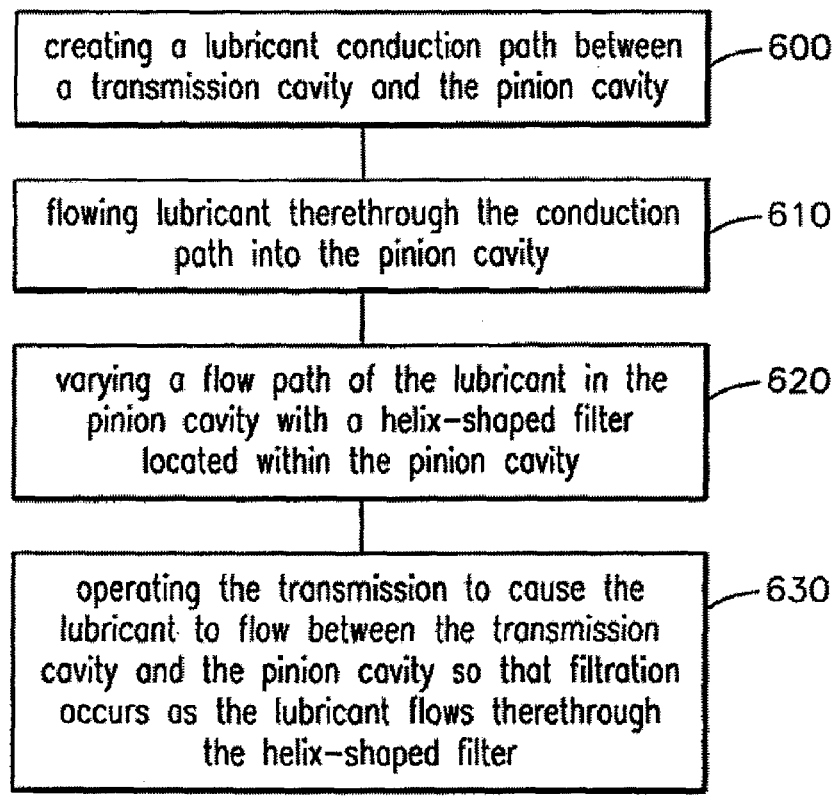
FIG. 8 depicts an exemplary embodiment of a method of the present invention.

FIG. 8 depicts a flow chart of an exemplary embodiment of a method of the present invention. As illustrated a lubricant conduction path is created between a transmission cavity and the pinion cavity, step 600. Lubricant flows therethrough the conduction path into the pinion cavity, step 610. Fluid pressure is not required to allow the lubricant to flow, and the flow is not restricted from reaching post filter parts of the transmission. The lubricant flow is assisted by the magnetic field created by the magnet 430. A flow path of the lubricant in the pinion cavity is varied with a twisted configured filter located within the pinion cavity, step 620. The transmission is operated to cause the lubricant to flow between the transmission cavity and the pinion cavity so that filtration occurs as the lubricant flows therethrough the helix shaped filter, step 630. The lubrication also makes contact with a filtration material 500 proximate the helix shaped element 410.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A filtration system for a motorized wheel off-highway vehicle transmission that is proximate a sun pinion bore within the transmission, the system comprising:
    a cover secured to the transmission covering the sun pinion bore, wherein a lubricating duct extends between the transmission and the sun pinion bore;
    a helix shaped element that traverses along a longitudinal axis of the sun pinion bore;
    a magnet proximate the helix shaped element; and
    a housing proximate the helix shaped element and magnet.

2. The filtration system of claim 1 wherein the magnet is located within the housing.

3. The filtration system of claim 1 further comprises a securing device to hold the helix shaped element.

4. The filtration system of claim 1 wherein fluid flows therethrough the helix shaped element without requiring fluid pressure.

5. The filtration system of claim 1 wherein fluid flows therethrough the helix shaped element without restricting flow to post filter parts of the transmission.

6. The filtration system of claim 1 further comprising a filtration material proximate the helix shaped element.

7. A method for providing filtration of oil within a motorized wheel off-highway vehicle transmission where the transmission has a pinion cavity, the method comprising:
    a. creating a lubricant conduction path between a transmission cavity and the pinion cavity;
    b. flowing the lubricant therethrough the conduction path into the pinion cavity;
    c. varying a flow path of the lubricant in the pinion cavity with a helix shaped filter located within the pinion cavity; and
    d. operating the transmission to cause the lubricant to flow between the transmission cavity and the pinion cavity so that filtration occurs as the lubricant flows therethrough the helix shaped filter.

8. The method of claim 7 further comprises improving lubricant flow with a magnet placed proximate the helix shaped filter.

9. The method of claim 7 wherein flowing lubricant further comprises lubricant flows therethrough the helix shaped filter without restricting flow to post filter parts of the transmission.

10. The method of claim 7 wherein flowing lubricant further comprises flowing lubricant therethrough the helix shaped filter without requiring fluid pressure.

11. The method of claim 7 further comprises flowing the lubricant proximate a filtration material that is located proximate the helix shaped filter.

* * * * *